United States Patent [19]

Woo et al.

[11] 4,263,623
[45] Apr. 21, 1981

[54] SLOW-FRAME VIDEO CAMERA/RECORDER AND IMAGE-SENSING AND SIGNAL PROCESSING DEVICE FOR USE THEREWITH

[75] Inventors: Nea-Yea Woo, Rochester; Evan A. Edwards, Pittsford, both of N.Y.

[73] Assignee: Eastman Kodak Company, Rochester, N.Y.

[21] Appl. No.: 26,480

[22] Filed: Apr. 2, 1979

[51] Int. Cl.³ .......................... H04N 5/78; H04N 3/14
[52] U.S. Cl. ...................................... 360/10; 358/213
[58] Field of Search .................. 358/4, 43, 44, 93, 127, 358/133–134, 160, 213; 360/9, 8, 10, 11

[56] References Cited

U.S. PATENT DOCUMENTS

| | | | |
|---|---|---|---|
| 3,085,130 | 4/1963 | Lemelson | 358/127 X |
| 3,391,248 | 5/1967 | Hirota | 178/6.6 |
| 3,775,568 | 11/1973 | Hino et al. | 360/9 X |
| 3,777,061 | 12/1973 | Takemura | 178/5.4 R |
| 3,833,758 | 9/1974 | Ferrari | 358/127 |
| 3,856,989 | 12/1974 | Weimer | 178/7.1 |
| 4,057,830 | 11/1977 | Adcock | 360/9 X |
| 4,130,834 | 12/1978 | Mender et al. | 358/134 X |
| 4,131,919 | 12/1978 | Lloyd et al. | 360/9 |

OTHER PUBLICATIONS

"Interlacing in Charge-Coupled Imaging Devices", Sequin, IEEE Transaction on Electron Devices, Jun. 1973, vol. ED-20, No. 6, pp. 535–541.
"Charge-Coupled Imager for 525-Line Television", Rodgers, III, Information Display, vol. 11, No. 6 (Jun. 1975) pp. 11–16.
"Charge-Coupling Technology Leads to Compact Video Camera", Watson, Bell Labs. Record, vol. 51, No. 9 (Oct. 1973) pp. 266–271.
"A Charge-Coupled Area Image Sensor and Frame Stove", Sequin et al., IEEE Transaction on Electron Devices, vol. ED-20, No. 3, Mar. 1973, pp. 244–252.

*Primary Examiner*—John H. Wolff
*Assistant Examiner*—Aristotelis M. Psitos
*Attorney, Agent, or Firm*—Thomas H. Close

[57] ABSTRACT

A self-contained video camera/recorder includes means for generating a video signal at a slow-frame rate corresponding to a submultiple of a standard television field rate. The slow-frame signal is recorded and played back at the slow-frame rate thereby reducing the bandwidth requirements of the recorder. Upon playback, the slow-frame signal is buffered, frame by frame. The buffered signal is time compressed, and each frame is repeated a number of times to yield a video signal wherein the frames occur at a standard field rate. According to the preferred embodiment of the invention, the means for generating the slow-frame video signal, and for buffering, time compressing and repeating the frames during playback, is a solid-state image sensing and signal processing device having an image sensing array, a first input register disposed for introducing signals into the sensing array, a storage array, a second input register disposed between the sensing array and the storage array for introducing signals into the storage array, and an output register for reading signals out of the storage array.

3 Claims, 5 Drawing Figures

FIG. 4a
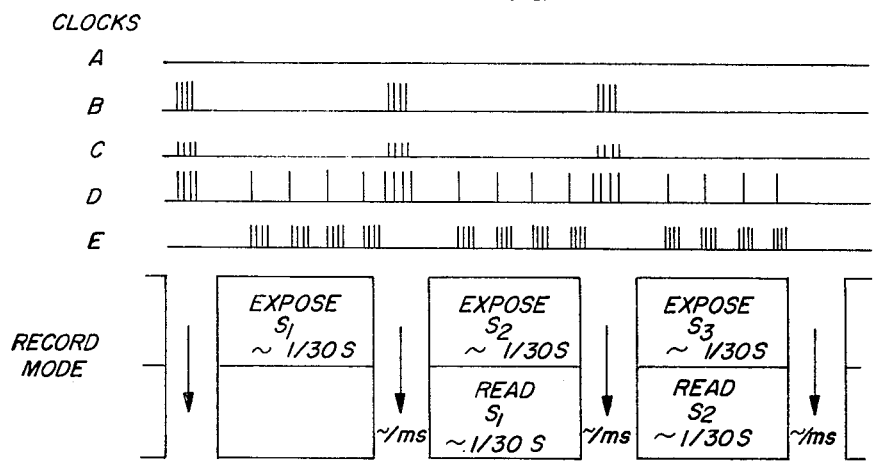
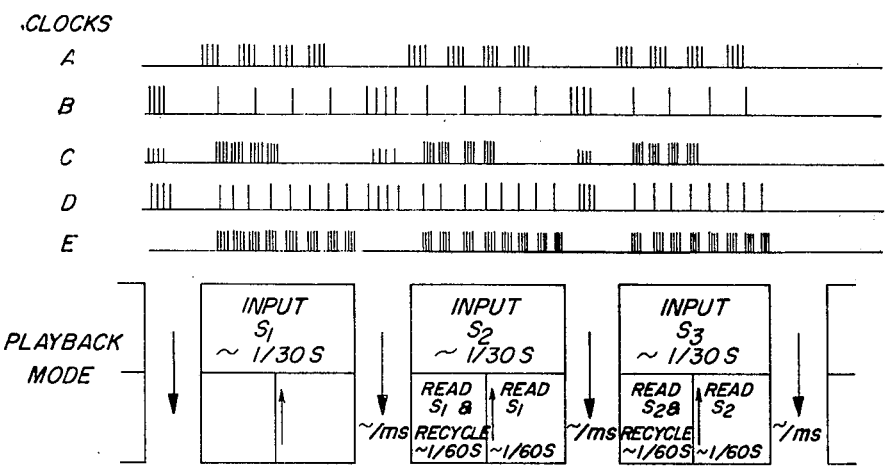
FIG. 4b

SLOW-FRAME VIDEO CAMERA/RECORDER AND IMAGE-SENSING AND SIGNAL PROCESSING DEVICE FOR USE THEREWITH

BACKGROUND OF THE INVENTION

1. Field of the Invention

The invention relates to apparatus for generating, recording and reproducing a video signal for display. The invention is particularly suitable for use in a self-contained video camera/recorder.

2. Discussion Relative to the Prior Art

Much research and development effort relating to video apparatus is presently being directed toward the realization of a hand-held, self-contained video camera/recorder resembling a conventional amateur film movie camera in size. Portable video camera/recorder combinations are presently commercially available, however, the hand-held cameras are physically separate from the larger video recorder/playback apparatus and electrically connected thereto by an umbilical cord.

Video tape playback apparatus customarily reproduces the video signal from the tape at a standard frame rate. Thus, the minimum bandwidth requirements for a tape recorder/player have conventionally been determined by the bandwidth of a standard video signal, e.g. up to approximately 10 MHz for a standard FM modulated color video signal. The relatively high bandwidth requirement for a video tape recorder/player militates against the miniaturization of the tape recorder apparatus required for packaging the recorder in a self-contained video camera/recorder of a size resembling a conventional movie film camera.

As is well known, each frame of a standard television signal comprises two interlaced fields so that, when viewed in sequence, the perceived effect is a picture having greater vertical resolution than either of the two fields viewed independently. In a procedure called "skip field recording", it is known to record only one field per frame, and upon playback to reproduce each recorded field twice in succession, thereby increasing the storage capacity of magnetic tape by a factor of 2. (See U.S. Pat. No. 3,391,248.) The resulting sacrifice in the vertical resolution of the reproduced picture is an acceptable trade-off in home video recording. Although the playing time may be increased, or conversely, the tape supply reduced, by this method, the bandwidth requirement of the video tape recorder/player remains as high as that of a conventional video recorder. Thus, although the size of the tape supply may be reduced by employing this procedure (skip field), miniaturization of the remaining components of the tape recorder is hindered by the relatively high bandwidth requirement.

SUMMARY OF THE INVENTION

By application of the invention, the bandwidth requirement of a video recorder may be substantially reduced, thereby facilitating the miniaturization of a video recorder for inclusion in a self-contained video camera/recorder. Conceptually, the invention effects a vertical resolution trade-off reminiscent of the prior art skip field recording concept, but departing therefrom in that the extra recording time gained is employed to reduce the tape recorder bandwidth requirement rather than to increase recorder capacity. To this effect, a solid-state image sensing array is employed to generate a slow-frame video signal comprising a sequence of frames occurring at a submultiple of a standard video field rate; each such slow-frame having a vertical resolution essentially equal to the vertical resolution of a standard TV field. The bandwidth of such a slow-frame video signal is a fraction of the bandwidth of a standard video signal albeit with reduced, though acceptable, vertical resolution. The reduced bandwidth slow-frame video signal thus generated is recorded on a magnetic tape at the slow-frame rate, thus allowing a video tape recorder having lower bandwidth capabilities than a standard video recorder to be employed. Upon playback, the slow-frame video signal is reproduced from the recording medium at the slow-frame rate. The video signal thus produced is buffered, frame by frame. The frames are time compressed and each frame is repeated a number of times to yield a video signal wherein the frames occur at a standard field rate. According to the preferred embodiment of the invention, the slow-frame video signal is generated, and upon playback is buffered, time compressed and the slow-frames repeated, by a single solid-state image sensing and signal processing device. The device includes an image sensing array, a first input register to the sensing array, a storage array, a second input register disposed between the sensing array and the storage array for putting signals into the storage array, and an output register for reading signals out of the storage array.

During slow-frame recording, the image sensing and signal processing device is operated in a manner similar to a frame transfer image sensor, however, at a slow-frame rate rather than a standard field rate. Upon playback the image sensing array is shielded from light, and the signal is read into the sensing array from the tape, via the first input register, one frame at a time. When one frame has been read into the image sensing array to create a charge pattern representing one frame therein, the charge pattern is quickly shifted to the storage array through the second input register. Time compression of the video signal, frame by frame, is easily accomplished by reading the charge pattern out of the storage array at a multiple of the rate at which it was originally produced. Meanwhile, the signal is recirculated into the storage array via the second input register for subsequent repeated readout. The signal is recirculated, frame by frame, for the required number of repetitions to provide a field rate equal to a standard video field rate. Thus, according to the preferred embodiment of the invention, the signal processing electronics required to generate the slow-frame video signal for recording, then to buffer, time compress and repeat the signal, frame by frame, during playback are all provided by a single image sensing and signal processing device.

BRIEF DESCRIPTION OF THE DRAWINGS

The invention will be described with reference to the accompanying drawings, wherein:

FIGS. 4a and 4b are diagrams of clock signals useful in explaining the operation of the present invention.

PREFERRED EMBODIMENT OF THE INVENTION

Figure 1:
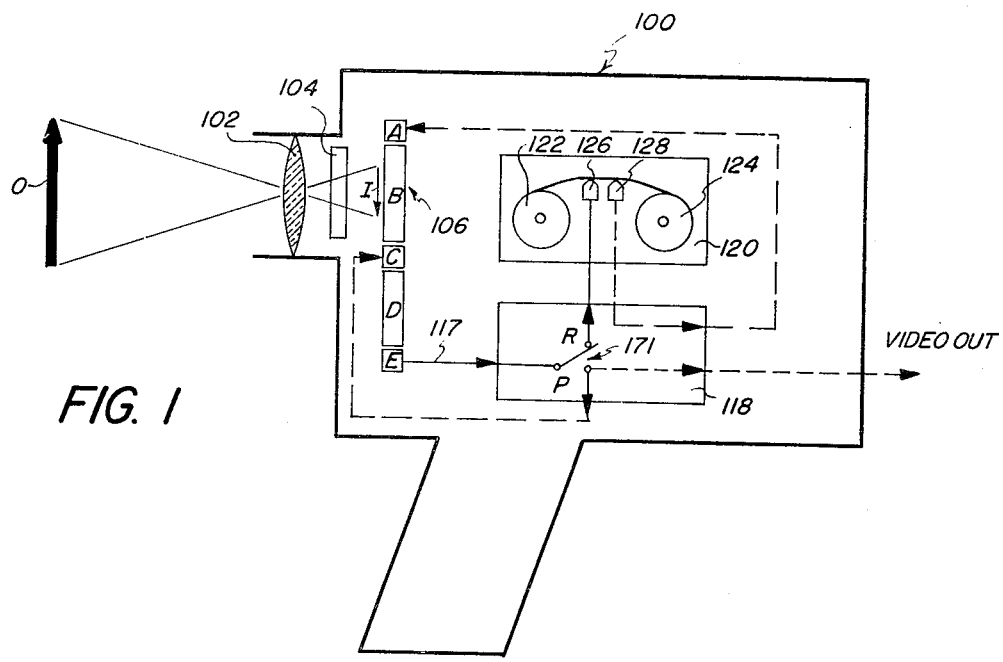
FIG. 1 is a schematic representation of a slow-frame camera/recorder incorporating the present invention.

Referring to FIG. 1, the general arrangement of a video camera/recorder according to the invention is shown having a camera body 100 supporting a lens 102 for forming an image I of an object O through an exposure control mechanism (an aperture and/or shutter) 104 onto an image sensor and signal processing device generally designated 106. The image sensing and signal processing device includes a first input register A, an image sensing array B, a second input register C, a frame storage array D and an output register E. A video signal produced from the device 106 is supplied via connection 117 to control and signal processing electronics 118. The video camera/recorder also includes a miniature magnetic tape recorder 120 having a supply of magnetic tape 122, a take-up 124, a recording head 126 and a playback head 128. The form of the tape recorder, i.e. whether a fixed head or rotating head recorder, is not an essential part of the invention and could comprise any of the well known forms for recording a video signal on a magnetic tape.

Figure 2:
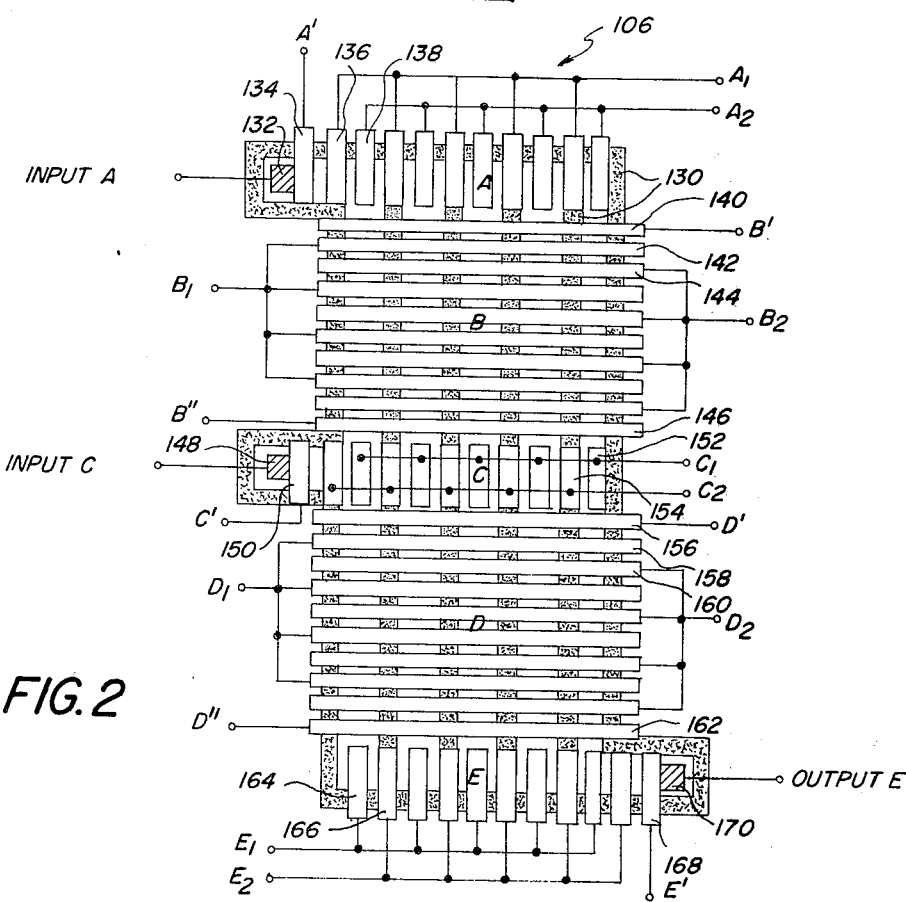
FIG. 2 is a schematic diagram showing an image sensing and signal processing device according to the present invention.

Refer now to FIG. 2 where the device 106 is shown in greater detail. Although the device is shown as a two-phase charge coupled device (CCD) in a frame transfer type configuration, it could as well be a three-phase or four-phase device. Rather than the frame transfer configuration shown, the image sensing array B of the device could be of an interline transfer configuration from which framewise charge patterns would be shifted into the frame storage array D. The channels of the charge coupled device may be either surface or buried. The image sensing array of the device may be superposed with a color filter array to comprise a color sensor.

The device is constructed on a chip of semiconductor material. The stippled areas in FIG. 2 represent channel defining means such as channel stopping diffusions. The first input register (register A) is a serial-to-parallel shift register having an input diode 132, an input gate 134, and a set of two-phase transfer electrodes 136 and 138. The image sensing array (array B) is a two-dimensional image sensing array disposed directly beneath register A, having an input gate 140, a two-phase transfer electrode structure 142 and 144, and an output gate 146. The second input register (register C) is disposed between the image sensing array B and the frame storage array D. The second input register C is a serial-to-parallel transfer register having an input diode 148, an input gate 150 and two-phase transfer electrode structure 152 and 154. A frame storage array (array D) is a two-dimensional array capable of storing the imagewise charge pattern generated by the image sensing array B. The frame storage array D includes an input gate 156, two-phase transfer electrode structure 158 and 160, and an output gate 162. An output register (register E) is disposed directly beneath frame storage array D and includes a two-phase electrode structure 164 and 166, an output gate 168 and an output diode 170.

Figure 3:
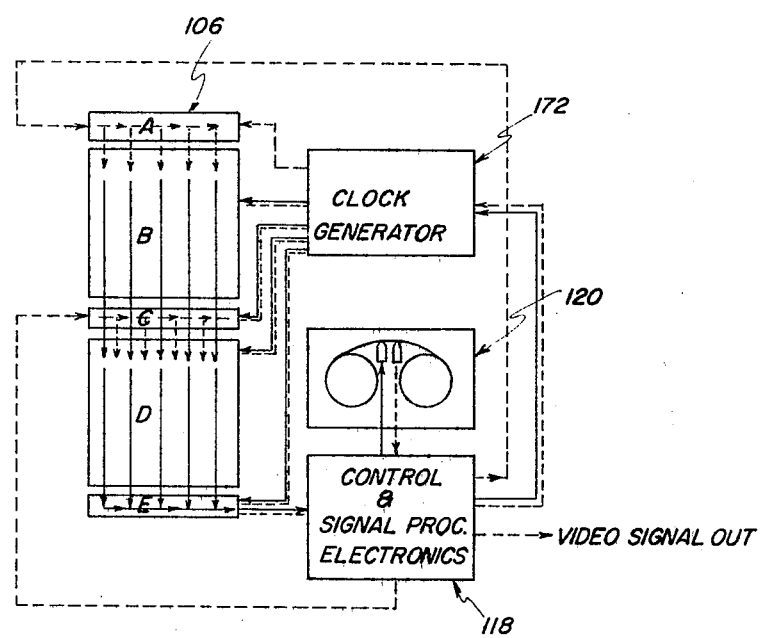
FIG. 3 is a schematic diagram illustrating signal flow during recording and playback.

Clock signals required for controlling charge transfer in the registers and arrays A through E of the CCD sensing and signal processing device 106 are generated by a clock generator 172 (see FIG. 3). The signals supplied to input gate 134, and the transfer gates 136 and 138 of input register A are designated A', $A_1$, $A_2$, respectively, in FIG. 2 and are collectively referred to as the A clocks in FIGS. 4a and 4b. Similarly, the signals supplied to input gate 140, two-phase transfer gates 142 and 144 and output gate 146 of image sensing array B are designated B', $B_1$, $B_2$, B", respectively, in FIG. 2 and are collectively referred to as the B clocks in FIGS. 4a and 4b. The signals and clocks for input register C, frame storage array D, and output register E are likewise designated with primed and subscripted capitol letters in FIG. 2 and are collectively referred to by the corresponding letter in FIGS. 4a and 4b.

The operation of the video camera/recorder according to the present invention will now be described. In FIGS. 1 and 3, the solid lines depict signal flow during operation of the video camera/recorder in the record mode and the dotted lines depict signal flow in the playback mode. The mode is selected by a mode control switch, shown simply as a single pole, double throw switch 171. The switch 171 is moved to the position marked R for record. For playback, the switch is moved to the position marked P.

In the record mode, scene light is imaged by lens 102 through exposure control device 104 onto the image sensing array B. For a period of time substantially equal to one slow-frame, approximately 1/30 of a second in the preferred embodiment, the B clocks are stopped (see FIG. 4a) while an imagewise charge pattern is integrated under one set of transfer electrodes in image sensing array B. After this exposure period (approximately 1/30 of a second), this charge pattern representing a first slow-frame $S_1$ is transferred into the frame storage array D during a "vertical retrace" period (approximately 1 millisecond) by activating the B and D clocks at a relatively fast rate as shown in FIG. 4a. The charge pattern representing $S_1$ is shifted vertically through the C register during the transfer cycle by supplying only the $C_1$ signal as each horizontal line in the charge pattern is shifted out of the image sensing array B and into the frame storage array D.

During the subsequent slow-frame period, a new charge pattern representing a second slow-frame $S_2$ is integrated in the image sensing array B and the charge pattern representing $S_1$ is read out of the frame storage array D, one line at a time, via output register E, and the signal generated thereby is supplied to the video tape recorder 120 through the control and signal processing electronics 118. During readout in the record mode, the D clocks are operated at a slow-frame line rate causing a row or line of charge to be dropped into the output register E during each slow-frame "horizontal retrace" period. The E clocks are operated at a slow-frame element rate (as shown in FIG. 4a) to shift each line of charge, one element at a time, to the output diode 170. The sequence is then repeated, shifting charge pattern $S_2$ to the frame storage array during the next slow-frame "vertical retrace" period and integrating a new charge pattern representing a third slow-frame $S_3$ while the charge pattern representing $S_2$ is read out and recorded. Since each slow-frame is recorded at a rate corresponding to a submultiple of a standard field rate, (e.g. approximately 1/30 of a second as opposed to one field in 1/60 of a second) and since the the number of lines per slow-frame is substantially equal to the number of lines per standard TV field, the required bandwidth capability of the recorder 120 is substantially less than the bandwidth requirements of a standard video recorder. This greatly facilitates the miniaturization of the video recorder 120. An additional advantage of the slow-frame camera/recorder concept is that the image sensing array B may integrate light for a longer period of time (e.g. 1/30 of a second versus 1/60 of a second) during the exposure of each slow-frame, thereby enhancing the low light capabilities of the slow-frame camera/recorder.

The operation of the slow-frame video camera/recorder in the playback mode will now be described with reference to FIG. 3. The dotted lines in FIG. 3 depict signal flow during playback. During playback, the mode select switch 171 is placed in the P position, and the exposure control device 104 (FIG. 1) blocks light from the image sensing array 110. The video signal was recorded on the tape at a slow-frame rate (e.g. one frame every 1/30 of a second) and it is read out at the same slow-frame rate. The signal from the tape recorder 120 is routed, via the control and signal processing electronics 118, to the input shift register A. The signal is read into the image sensing array B one line at a time from register A by operating the A clocks at a slow-frame element rate and the B clocks at a slow-frame line rate as shown in FIG. 4b. Thus, the image sensing array B is employed as an input buffer during playback. After a charge pattern representing a complete frame $S_1$ is read into array B, and during the slow-frame "vertical retrace" period, the charge pattern representing $S_1$ is shifted rapidly, in about 1 millisecond, into storage array D by operating the B & D clocks at a relatively fast rate as shown in FIG. 4b. The charge pattern representing $S_1$ is shifted vertically through register C during the transfer cycle by supplying only the $C_1$ signal as each horizontal line in the charge pattern is shifted out of the sensing array B and into the storage array D. Immediately following, a charge pattern representing the next frame $S_2$ commences to be read into array B. During the time that the charge pattern representing frame $S_2$ is being read into the image sensing array B, the charge pattern representing frame $S_1$ is read out, one line at a time, from array D via output register E at a standard field rate (1/60 of a second per field for an NTSC system). During readout, the D clocks are operated at a standard (e.g. NTSC) line rate and the E clocks at a standard element rate. As each charge element is read out of register E, it is recirculated via register C back into the storage array D. The C clocks, as shown in FIG. 4b, are operated at a standard element rate to effect the recirculation. When the first readout is complete, the charge pattern representing the frame is read out a second time at the standard field rate. Each frame is repeatedly read out for the required number of times, e.g. two in the preferred embodiment. As the last line of the charge pattern representing frame $S_2$ is loaded into array B, the required number of readouts of the charge pattern representing frame $S_1$ will be complete. The charge pattern representing frame $S_2$ will then be shifted rapidly into array D as described above and read out and recirculated.

Thus, the signal processing electronics required to buffer the slow-frame signal from the recorder 120 and to time compress and repeat the signal frame by frame to provide a standard field rate video signal are provided by the image sensing and signal processing device 118.

The invention has been described in detail with particular reference to a preferred embodiment thereof, but it will be understood that variations and modifications can be effected within the spirit and scope of the invention. Particularly, although a slow-frame rate of 30 frames per second has been described, the invention is equally useful with a slow-frame rate of 20 frames per second wherein each frame is time compressed and repeated three times upon playback. Similarly, a frame rate of 15 frames per second or any integral submultiple of 60 frames per second would be compatible with an NTSC system, or any integral submultiple of the field rate of any other standard television system could be employed as the slow-frame rate.

A magnetic tape recorder has been described as the recording apparatus in connection with the preferred embodiment of the invention, however, it is to be understood that the invention could be employed with other forms of recording apparatus, such as magnetic disc, or drum, or magnetic bubble devices to reduce the required storage capacity for the video signal.

We claim:

1. A solid state image sensing and signal processing device for use with a slow-frame video camera/recorder, comprising:
    a two-dimensional image sensing array responsive to an imagewise pattern of light for generating an imagewise charge pattern;
    a frame storage array for receiving and temporarily storing said imagewise charge pattern generated by said image sensing array;
    a first serial-to-parallel input register arranged for introducing an imagewise charge pattern into said image sensing array;
    a second serial-to-parallel input register, disposed between said image sensing array and said frame storage array, and arranged for introducing an imagewise charge pattern into said storage array and for transferring an imagewise charge pattern from said sensing array to said storage array; and
    a parallel-to-serial output register arranged to read out an imagewise charge pattern from said storage array to produce a video signal.

2. A slow-frame video camera/recorder, comprising:
    a. a solid state image sensing and signal processing device having:
        a two-dimensional image sensing array responsive to an imagewise pattern of light for generating an imagewise charge pattern;
        a frame storage array for receiving and temporarily storing said imagewise charge pattern generated by said image sensing array;
        a first serial-to-parallel input register arranged for introducing an imagewise charge pattern into said image sensing array;
        a second serial-to-parallel register, disposed between said image sensing array and said frame storage array, and arranged for introducing an imagewise charge pattern into said storage array and for transferring an imagewise charge pattern from said sensing array to said storage array; and
        a parallel-to-serial output register arranged to read out an imagewise charge pattern from said storage array to produce a video signal;
    b. magnetic tape recorder means for recording and playing back a video signal; and
    c. control means, operative in a record mode for causing said solid-state image sensing and signal processing device to generate a video signal composed of successive slow-frames occurring at a rate corresponding to a submultiple of a standard field rate and to supply said slow-frame signal to said recorder for for recording, and operative in a playback mode for supplying said recorded slow-frame video signal to said solid-state image sensing and signal processing device and for causing said device to time compress said signal, frame by frame, and to repeat said time compressed frames a number of times to produce a video signal at said standard field rate.

3. A solid state device for use with a slow-frame video recorder, comprising:

first and second two-dimensional arrays for holding imagewise charge patterns representing video information;

a first serial-to-parallel input register arranged for introducing an imagewise charge pattern into said first two-dimensional array;

a second serial-to-parallel input register, disposed between said first and second two-dimensional arrays, and arranged for introducing an imagewise charge pattern into said second two-dimensional array; and a parallel-to-serial output register arranged to read out an imagewise charge pattern from said second two-dimensional array to produce a video signal.

* * * * *